United States Patent
Kobayashi et al.

(10) Patent No.: US 11,643,030 B2
(45) Date of Patent: May 9, 2023

(54) VEHICLE

(71) Applicant: TOYOTA JIDOSHA KABUSHIKI KAISHA, Toyota (JP)

(72) Inventors: Takenori Kobayashi, Toyota (JP); Junta Katayama, Miyoshi (JP); Toru Kawamiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 17/031,239

(22) Filed: Sep. 24, 2020

(65) Prior Publication Data
US 2021/0094488 A1 Apr. 1, 2021

(30) Foreign Application Priority Data
Sep. 30, 2019 (JP) .............................. JP2019-178216

(51) Int. Cl.
| | |
|---|---|
| *B60R 16/023* | (2006.01) |
| *B60K 6/28* | (2007.10) |
| *B62D 25/20* | (2006.01) |
| *B60K 13/04* | (2006.01) |
| *B60K 6/24* | (2007.10) |

(52) U.S. Cl.
CPC ............ *B60R 16/0231* (2013.01); *B60K 6/24* (2013.01); *B60K 6/28* (2013.01); *B60K 13/04* (2013.01); *B62D 25/20* (2013.01)

(58) Field of Classification Search
CPC ..... B60R 16/0231; B60R 16/023; B60K 6/24; B60K 6/28; B60K 13/04; B60K 1/04; B60K 2001/0438; B60K 6/26; B62D 25/20; B60Y 2400/61; B60Y 2410/115; B60Y 2400/112; Y02E 60/10; Y02T 10/70; B60L 50/64; H01M 50/249; H01M 2220/20

See application file for complete search history.

(56) References Cited

U.S. PATENT DOCUMENTS

| | | | |
|---|---|---|---|
| 2009/0246606 A1* | 10/2009 | Shimizu | ............ H01M 10/6569 429/62 |
| 2013/0280561 A1 | 10/2013 | Tolkacz et al. | |
| 2018/0093584 A1 | 4/2018 | Kamikihara et al. | |
| 2020/0079205 A1* | 3/2020 | Ohkuma | ................. B60L 53/12 |

FOREIGN PATENT DOCUMENTS

| | | |
|---|---|---|
| CN | 107891770 A | 4/2018 |
| JP | 2018-058406 A | 4/2018 |
| JP | 2018-140678 A | 9/2018 |

* cited by examiner

*Primary Examiner* — Jacob M Amick
*Assistant Examiner* — Charles J Brauch
(74) *Attorney, Agent, or Firm* — Sughrue Mion, PLLC (57) ABSTRACT

A vehicle includes: an electronic device accommodated in an accommodation case of a power storage device; and a signal wiring connected to an electronic device and an in-vehicle device, the signal wiring being a signal wiring in which a signal to be received or transmitted by the electronic device or the in-vehicle device travels. An exhaust pipe is disposed at a position adjacent to a first side surface, and the signal wiring is drawn out from the second side surface to outside of the accommodation case.

2 Claims, 8 Drawing Sheets

VEHICLE

This nonprovisional application is based on Japanese Patent Application No. 2019-178216 filed on Sep. 30, 2019, with the Japan Patent Office, the entire contents of which are hereby incorporated by reference.

BACKGROUND

Field

The present disclosure relates to a vehicle, particularly, a vehicle including a power storage device.

Description of the Background Art

Conventionally, various types of vehicles including power storage devices have been proposed. For example, a vehicle described in Japanese Patent Laying-Open No. 2018-140678 includes a vehicle body, a power storage device, and a driving device.

The vehicle body includes a floor panel that forms a bottom surface of the vehicle, and the power storage device is disposed on a lower surface of the floor panel.

The driving device includes an engine and a rotating electrical machine, and the engine and the rotating electrical machine are disposed in an engine compartment formed on the front side of the vehicle.

An exhaust pipe is connected to the engine, and is formed to extend from the engine toward the back side of the vehicle. The exhaust pipe is disposed to pass through the vicinity of one side surface of the power storage device.

SUMMARY

The power storage device includes an accommodation case, a power storage module disposed in the accommodation case, and a control unit. A high-voltage wiring is connected to the power storage module, and is drawn to outside of the accommodation case. The high-voltage wiring is connected to a PCU, and the PCU is electrically connected to the rotating electrical machine. A signal wiring is connected to the control unit, and the signal wiring is connected to an in-vehicle device provided outside the power storage device.

Here, since high-temperature exhaust gas from the engine flows in the exhaust pipe, the temperature of the exhaust pipe becomes high. Further, potential applied to the high-voltage wiring is higher than voltage applied to the signal wiring, with the result that a noise may be emitted from the high-voltage wiring.

Therefore, the signal wiring is likely to be affected by heat from the exhaust pipe, a noise emitted from the high-voltage wiring, and the like.

The present disclosure has been made in view of the above problem, and has an object to provide a vehicle in which a signal wiring is suppressed from being affected by heat from an exhaust pipe and a noise emitted from a high-voltage wiring.

A vehicle according to the present disclosure includes: a power storage device; an internal combustion engine; an exhaust pipe connected to the internal combustion engine; and an in-vehicle device provided outside the power storage device. The power storage device includes: an accommodation case including a front surface, a back surface, a first side surface, and a second side surface located opposite to the first side surface; a power storage module accommodated in the accommodation case; a high-voltage wiring connected to the power storage module and drawn out from the front surface or the back surface to outside of the accommodation case; an electronic device accommodated in the accommodation case; and a signal wiring connected to the electronic device and the in-vehicle device, the signal wiring being a signal wiring in which a signal to be received or transmitted by the electronic device or the in-vehicle device travels. The exhaust pipe is disposed at a position adjacent to the first side surface, and the signal wiring is drawn out from the second side surface to the outside of the accommodation case.

According to the vehicle, since the exhaust pipe is provided on the first side surface side and the signal wiring is provided on the second side surface side, heat emitted from the exhaust pipe can be suppressed from reaching the signal wiring. Further, even when an electromagnetic wave resulting from a noise is emitted from the high-voltage wiring to surroundings, the electromagnetic wave can be suppressed from reaching the signal wiring.

The high-voltage wiring extends from the front surface of the accommodation case toward a front side or upper side of the vehicle, and the signal wiring is provided to extend from the second side surface toward a back side or upper side of the vehicle.

According to the vehicle, even when an electromagnetic wave resulting from a noise is emitted from the high-voltage wiring to the surroundings, the electromagnetic wave is suppressed from reaching the signal wiring.

The vehicle further includes a floor panel that partitions inside of the vehicle and outside of the vehicle. The in-vehicle device is provided in the inside of the vehicle, and the floor panel is provided with a through hole via which the signal wiring enters the inside of the vehicle.

According to the vehicle, at a portion of the signal wiring located inside the vehicle, heat emitted from the exhaust pipe and an electromagnetic wave from the high-voltage wiring are suppressed from reaching the signal wiring.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Vehicles according to first to third embodiments will be described with reference to FIGS. 1 to 10. In configurations shown in FIGS. 1 to 10, the same or substantially the same configurations are given the same reference characters, and will not be described repeatedly. It should be noted that in FIG. 2 and the like, "U" indicates an upward direction, "D" indicates a downward direction, "L" indicates a left direction, and "R" indicates a right direction.

First Embodiment

Figure 1:
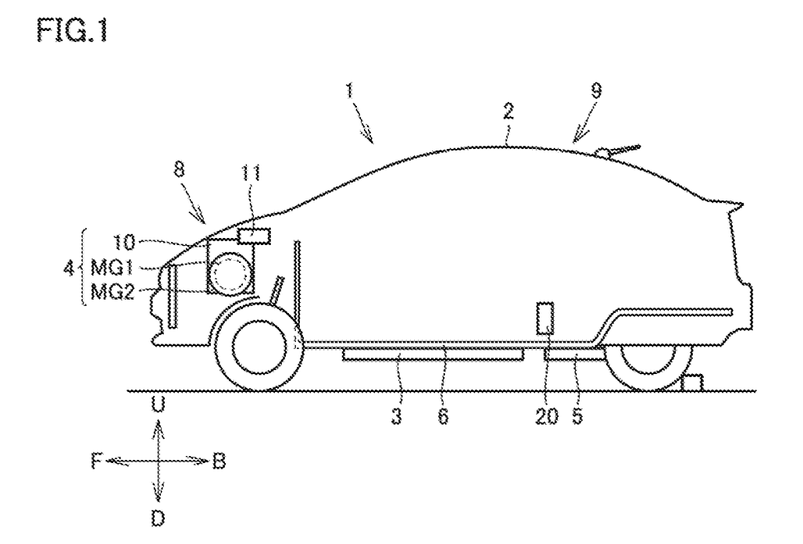
FIG. 1 is a schematic view schematically showing a vehicle 1 on which a power storage device is mounted, according to a first embodiment.

FIG. 1 is a schematic view schematically showing a vehicle 1 on which a power storage device is mounted, according to the first embodiment. Vehicle 1 includes a vehicle body 2, a power storage device 3, a driving device 4, a fuel tank 5, and an ECU 20. Vehicle body 2 includes a floor panel 6 that forms a bottom surface of vehicle 1. An engine compartment 8 and a vehicle compartment 9 are formed in vehicle body 2. Engine compartment 8 is formed on the front side relative to vehicle compartment 9.

Vehicle compartment 9 is, for example, a space in which a passenger is to be on board. In the example shown in FIG. 1, ECU 20 is accommodated in vehicle compartment 9.

Driving device 4 includes an engine 10, rotating electrical machines MG1, MG2, and a PCU 11. PCU 11 includes, for example, two inverters and a converter. One inverter is electrically connected to rotating electrical machine MG1, and the other inverter is connected to rotating electrical machine MG2. The converter is electrically connected to power storage device 3. Rotating electrical machine MG2 mainly functions as a motor for rotating driving wheels, and rotating electrical machine MG1 mainly functions as a power generator. Engine 10 is driven by fuel supplied from fuel tank 5 and generates driving force for rotating the driving wheels. ECU 20 controls driving of PCU 11 and engine 10.

Power storage device 3 and fuel tank 5 are provided on a lower surface of floor panel 6. Fuel tank 5 is disposed on the back side relative to power storage device 3.

Figure 2:
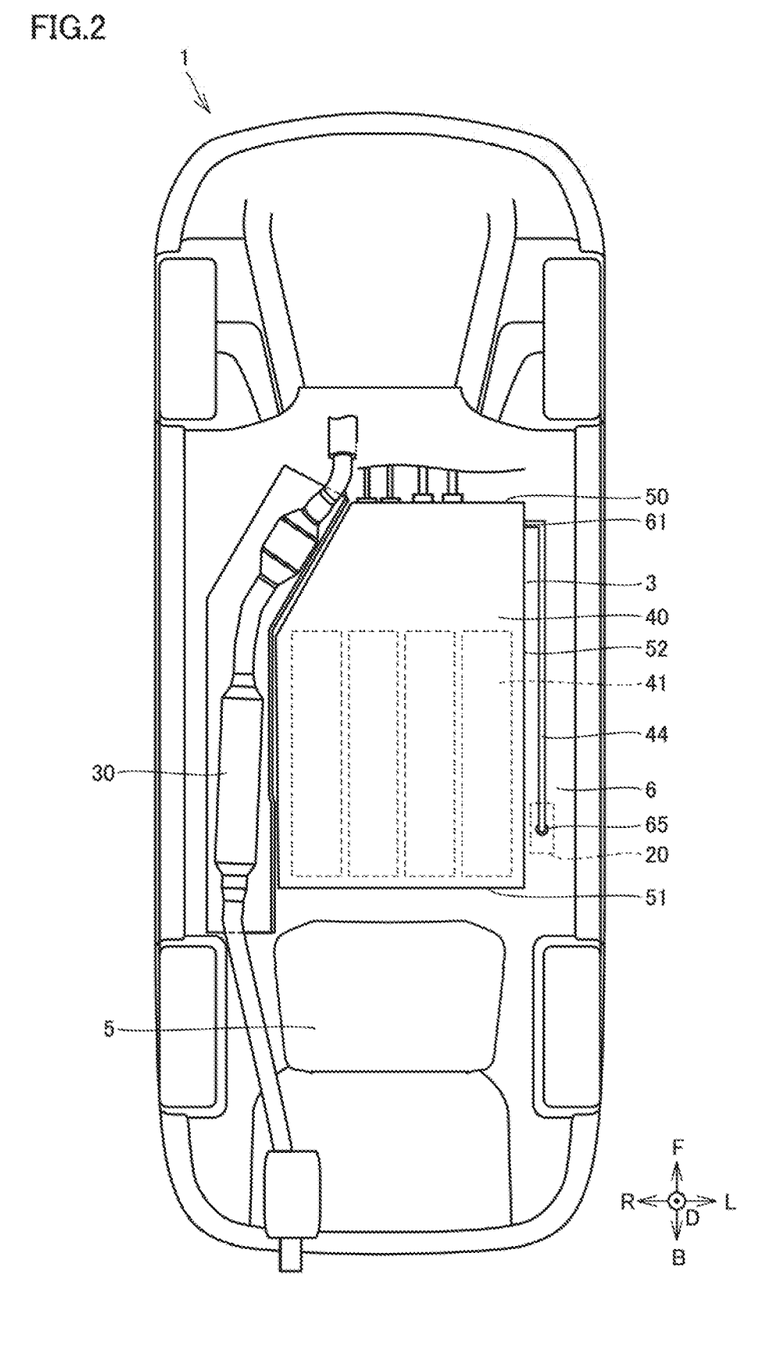
FIG. 2 is a bottom view showing a bottom surface of vehicle 1.
Figure 3:
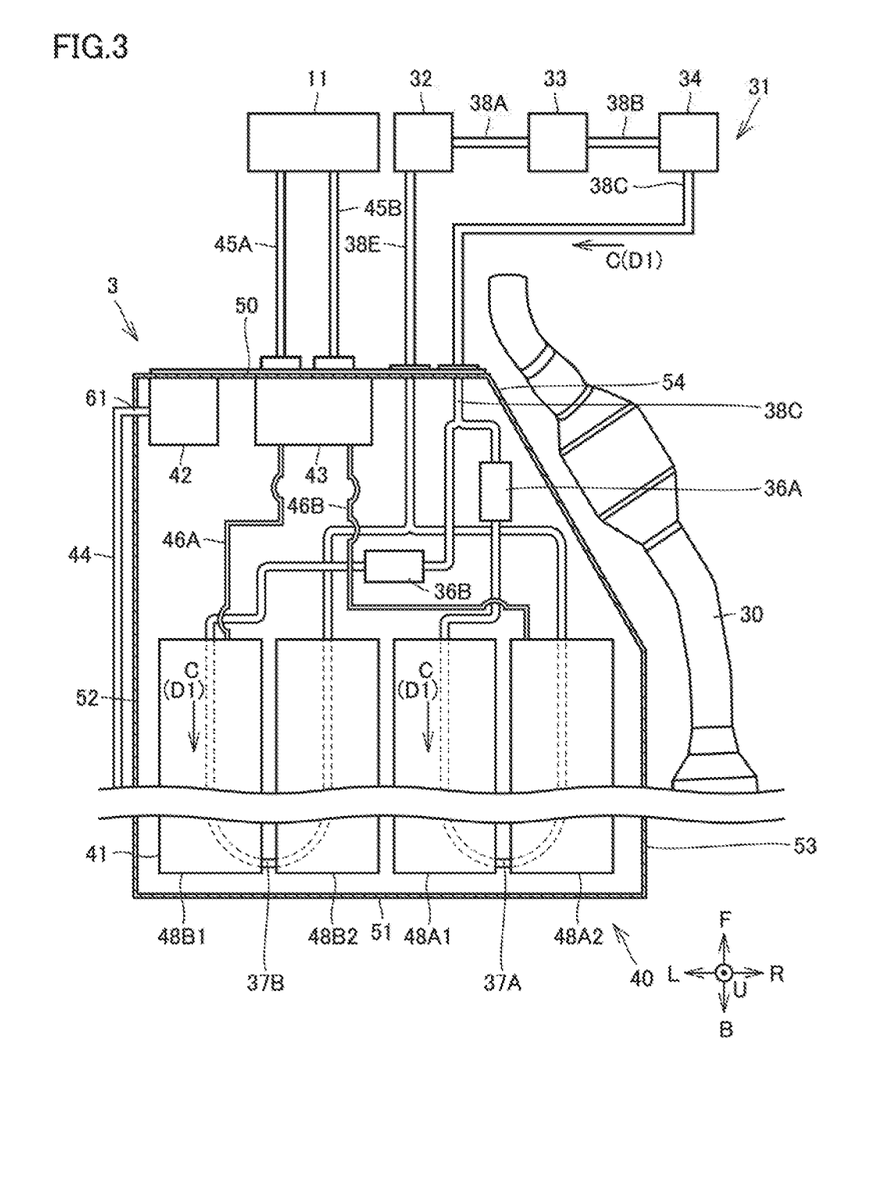
FIG. 3 is a plan view schematically showing configurations of a power storage device 3 and its surroundings.

FIG. 2 is a bottom view showing the bottom surface of vehicle 1, and FIG. 3 is a plan view schematically showing configurations of power storage device 3 and its surroundings.

Power storage device 3 includes an accommodation case 40, a power storage module 41, a battery ECU 42, and a junction box 43.

Accommodation case 40 includes a front end surface 50, a back end surface 51, a side surface 52, a side surface 53, and an inclined side surface 54. In the example shown in FIG. 3, side surface 52 is located on the left side. Side surface 53 and inclined side surface 54 are located opposite to side surface 52, i.e., are located on the right side. Side surface 53 and inclined side surface 54 form a "first side surface", and side surface 52 corresponds to a "second side surface".

It should be noted that inclined side surface 54 is connected to a tip portion of side surface 53, and is inclined to come closer to side surface 52 as inclined side surface 54 extends toward the front side.

Power storage module 41 includes a plurality of power storage units 48A1, 48A2, 48B1, 48B2. Power storage units 48A1, 48A2, 48B1, 48B2 are provided with spaces being interposed therebetween in the width direction of vehicle 1. Power storage units 48A1, 48A2, 48B1, 48B2 are electrically connected to one another in series.

It should be noted that each of power storage units 48A1, 48A2, 48B1, 48B2 includes a plurality of power storage cells. The power storage cells are arranged in rows in the front-back direction of vehicle 1. Examples of each power storage cell include: a secondary battery such as a lithium ion battery; a capacitor; and the like.

Battery ECU 42 and junction box 43 are provided on the front side relative to power storage module 41.

High-voltage wirings 45A, 45B and high-voltage wirings 46A, 46B are connected to junction box 43. High-voltage wirings 45A, 45B electrically connect junction box 43 to PCU 11. High-voltage wirings 46A, 46B electrically connect junction box 43 to power storage module 41. A relay is provided in junction box 43. Junction box 43 switches the electrical connections of high-voltage wirings 45A, 45B and high-voltage wirings 46A, 46B.

A signal wiring 44 including a signal line or the like is connected to battery ECU 42, and electrically connects battery ECU 42 to ECU 20.

Battery ECU 42 receives signals transmitted from a temperature sensor, a current sensor, and a voltage sensor each provided in power storage module 41, and calculates an SOC of power storage module 41, for example. Battery ECU 42 transmits information such as the calculated SOC to ECU 20 via signal wiring 44. Further, battery ECU 42 receives a signal from ECU 20 via signal wiring 44. Based on the signal received from ECU 20, battery ECU 42 controls driving of junction box 43 to switch the electrical connections of high-voltage wirings 45A, 45B and high-voltage wirings 46A, 46B.

Battery ECU 42 and junction box 43 are provided on the front side of vehicle 1 relative to power storage module 41. Battery ECU 42 is provided on the side surface 52 side relative to junction box 43.

Vehicle 1 includes an exhaust pipe 30 and a cooling circuit 31. Exhaust pipe 30 is connected to engine 10. Exhaust pipe 30 is formed to extend through the lower surface of floor panel 6 and extend toward the back side of vehicle 1. Exhaust pipe 30 is provided to pass through a position adjacent to inclined side surface 54 and side surface 53, and is formed to extend along inclined side surface 54 and side surface 53.

Cooling circuit 31 includes a compressor 32, a condenser 33, a receiver tank 34, expansion valves 36A, 36B, cooling pipes 37A, 37B, and a plurality of coolant pipes 38A, 38B, 38C, 38E. Coolant C circulates in cooling circuit 31. Coolant C flows in a flow direction D1.

Coolant pipe 38C and cooling pipe 37A are connected to expansion valve 36A, and coolant pipe 38C is connected to receiver tank 34. Coolant pipe 38C and cooling pipe 37B are connected to expansion valve 36B.

Cooling pipes 37A, 37B are disposed on the lower surface of power storage module 41 to cool power storage module 41. In flow direction D1, the downstream ends of cooling pipes 37A, 37B are connected to coolant pipe 38E, and coolant pipe 38E is connected to compressor 32 provided outside power storage device 3.

Coolant pipe 38C and coolant pipe 38E are drawn out from inside of accommodation case 40 to outside of accommodation case 40, and coolant pipes 38C, 38E are drawn out from front end surface 50 of accommodation case 40 to the outside.

Signal wiring 44 is connected to battery ECU 42. Signal wiring 44 is connected to ECU 20 provided in vehicle body 2.

Signal wiring 44 is connected to a side surface of battery ECU 42 located on the side surface 52 side. Signal wiring 44 is drawn out to the outside of accommodation case 40 via a through hole 61 formed in side surface 52 of accommodation case 40.

A through hole 65 shown in FIG. 2 is formed in floor panel 6. Through hole 65 is located on the front side of vehicle 1 relative to back end surface 51 of accommodation case 40. Through hole 65 is formed at a position adjacent to side surface 52 of accommodation case 40.

Signal wiring 44 drawn out to the outside of accommodation case 40 via through hole 65 is formed to extend toward the back side of vehicle 1. Signal 44 enters the inside of vehicle 1 via through hole 65 and is connected to ECU 20. Therefore, signal wiring 44 is formed to extend along side surface 52 of accommodation case 40.

Figure 4:
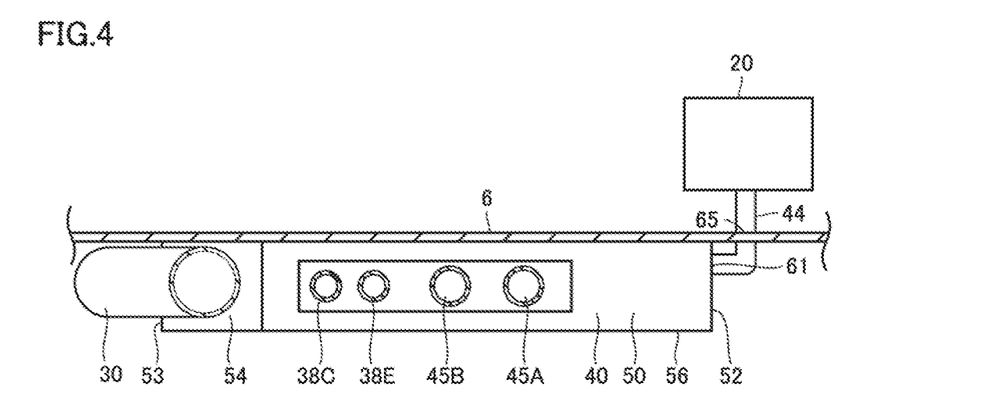
FIG. 4 is a front view of power storage device 3 when viewed from the front end surface 50 side.

FIG. 4 is a front view of power storage device 3 when viewed from the front end surface 50 side. Accommodation case 40 includes a lower surface 56. Signal wiring 44 is located on the upper side relative to lower surface 56.

Through hole 61 is located on the upper side relative to the center of side surface 52 in the upward-downward direction. It should be noted that through hole 65 is formed in floor panel 6 and is therefore located on the upper side relative to through hole 61. Signal wiring 44 is provided to extend via through hole 61 and through hole 65. Signal wiring 44 is also located on the upper side relative to the center of side surface 52 in the upward-downward direction. Exhaust pipe 30 is located on the upper side relative to lower surface 56.

In vehicle 1 configured as described above, when engine 10 is driven, exhaust gas flows in exhaust pipe 30. When the exhaust gas flows in exhaust pipe 30, the temperature of exhaust pipe 30 becomes high.

Exhaust pipe 30 is provided along inclined side surface 54 and side surface 53, each of which is a right side surface of accommodation case 40. On the other hand, signal wiring 44 is disposed along side surface 52 located opposite to inclined side surface 54 and side surface 53.

Therefore, even when the temperature of exhaust pipe 30 becomes high, heat emitted from exhaust pipe 30 can be suppressed from reaching signal wiring 44. In particular, since signal wiring 44 is located on the upper side relative to the center of side surface 52 in the upward-downward direction, the heat emitted from exhaust pipe 30 is suppressed from reaching signal wiring 44.

In FIG. 3, when PCU 11 is driven, an inverter provided in PCU 11 is driven. The inverter is provided with a plurality of switching elements such as IGBTs, and these switching elements are driven when the inverter is driven. By the switching elements being driven, noises are generated. Since high-voltage wirings 45A, 45B are electrically connected to the switching elements, the noises generated in the switching elements propagate also to high-voltage wirings 45A, 45B.

When the noises travel in high-voltage wirings 45A, 45B, electromagnetic waves resulting from the noises are emitted also to surroundings of high-voltage wirings 45A, 45B.

Here, high-voltage wirings 45A, 45B are drawn out from front end surface 50 of accommodation case 40 to the outside of accommodation case 40, whereas signal wiring 44 is provided on the side surface 52 side.

Therefore, even when the electromagnetic waves resulting from the noises are emitted from high-voltage wirings 45A, 45B to the surroundings outside accommodation case 40, the electromagnetic waves can be suppressed from reaching signal wiring 44.

As described above, in vehicle 1 according to the present embodiment, signal wiring 44 can be suppressed from being affected by the heat emitted from exhaust pipe 30, and can be suppressed from being affected by the electromagnetic waves emitted from high-voltage wirings 45A, 45B.

Further, high-voltage wirings 45A, 45B are formed to extend from front end surface 50 toward the front side, and signal wiring 44 is formed to extend from through hole 61 formed in side surface 52 toward the back side. Therefore, even when electromagnetic waves are emitted from high-voltage wirings 45A, 45B to the surroundings, the electromagnetic waves are unlikely to reach signal wiring 44.

As shown in FIG. 4 and the like, signal wiring 44 is drawn into the inside of the vehicle via through hole 65 formed in floor panel 6, and is connected to ECU 20 disposed in the vehicle. Therefore, the portion of signal wiring 44 located inside the vehicle is suppressed from being affected by heat from exhaust pipe 30 and electromagnetic waves from high-voltage wirings 45A, 45B.

Here, in FIG. 3, noises conveyed to high-voltage wirings 45A, 45B may travel in high-voltage wirings 46A, 46B through junction box 43. When noises travel in high-voltage wirings 46A, 46B, electromagnetic waves resulting from the noises are emitted from high-voltage wirings 46A, 46B in accommodation case 40.

In this case, in FIG. 3, signal wiring 44 is drawn out immediately from the side surface of battery ECU 42 on the side surface 52 side to the outside of accommodation case 40 via through hole 61. Therefore, only a very small portion of signal wiring 44 is located in accommodation case 40. Hence, even when electromagnetic waves are emitted from high-voltage wirings 46A, 46B in driving device 4, the electromagnetic waves can be suppressed from reaching signal wiring 44 in accommodation case 40.

Second Embodiment

Figure 5:
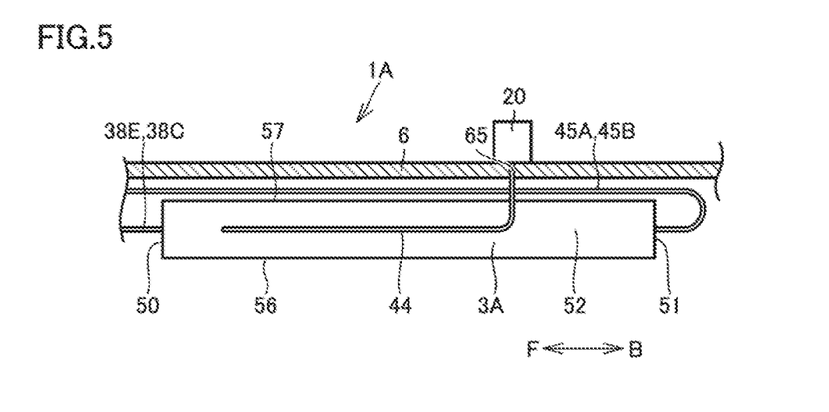
FIG. 5 is a side view showing configurations of a power storage device 3A mounted on a vehicle 1A and its surroundings.
Figure 6:
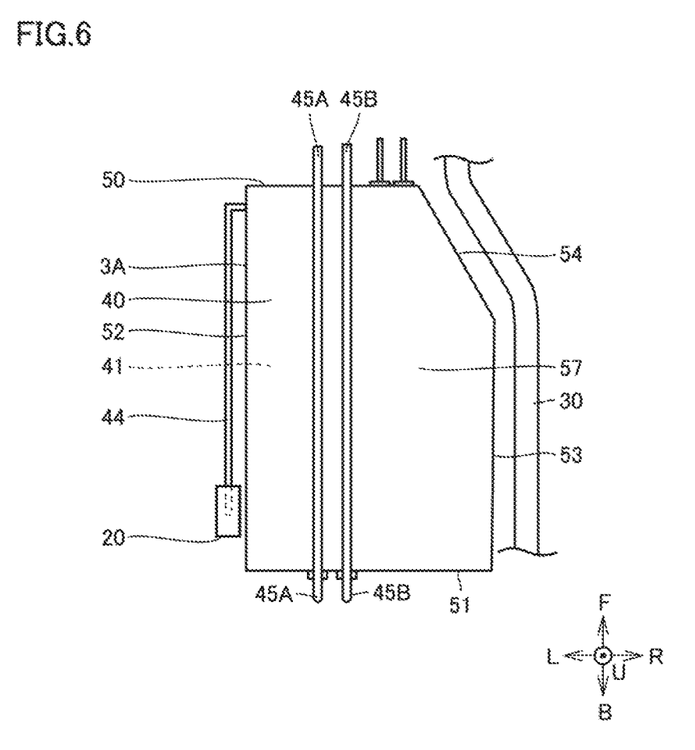
FIG. 6 is a plan view showing the configurations of power storage device 3A and its surroundings.

A vehicle 1A according to the second embodiment will be described with reference to FIG. 5 and the like. FIG. 5 is a side view showing configurations of a power storage device 3A mounted on vehicle 1A and its surroundings, and FIG. 6 is a plan view showing the configurations of power storage device 3A and its surroundings.

In vehicle 1A, power storage device 3A is disposed to be separated from the lower surface of floor panel 6. It should be noted that power storage device 3A is fixed to floor panel 6 by a fixing member (not shown). Therefore, a space is formed between an upper surface 57 of power storage device 3A and the lower surface of floor panel 6.

In the example shown in FIG. 5, high-voltage wirings 45A, 45B are drawn out from back end surface 51 of power storage device 3 to the outside. High-voltage wirings 45A, 45B are bent to extend toward the upper side, and are disposed above upper surface 57. High-voltage wirings 45A, 45B are formed to extend toward the front side of vehicle 1A.

On the other hand, signal wiring 44 is formed to be drawn from side surface 52 of power storage device 3A and then extend toward the hack side of vehicle 1A.

Further, signal wiring 44 is formed to extend toward the upper side, and is connected to ECU 20 via through hole 65 formed in floor panel 6.

Figure 7:
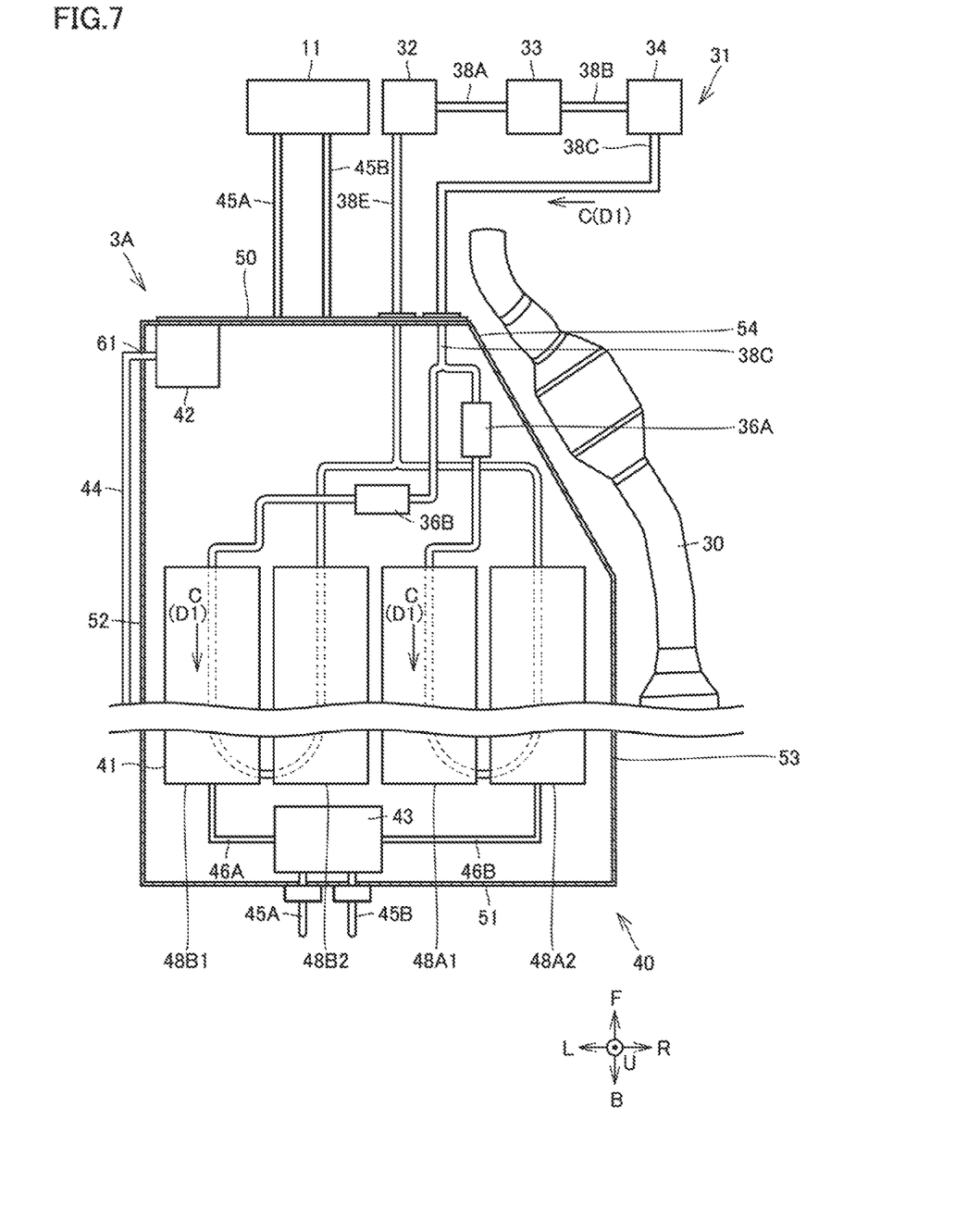
FIG. 7 is a plan view schematically showing power storage device 3A and its internal configuration.

FIG. 7 is a plan view schematically showing power storage device 3A and its internal configuration. In power storage device 3A, junction box 43 is disposed on the back side relative to power storage module 41. High-voltage wiring 46A is connected to the back end of power storage unit 48B1, and high-voltage wiring 46B is connected to the back end of power storage unit 48A2.

High-voltage wirings 45A, 45B are connected to junction box 43 and are drawn out from back end surface 51 to the outside.

It should be noted that also in vehicle 1A, exhaust pipe 30 is disposed to extend along inclined side surface 54 and side surface 53 of power storage device 3.

In vehicle 1A thus configured, exhaust pipe 30 is disposed on the inclined side surface 54 and side surface 53 side, whereas signal wiring 44 is disposed on the side surface 52 side. Therefore, even when the temperature of exhaust pipe 30 becomes high, heat from exhaust pipe 30 is suppressed from reaching signal wiring 44.

Moreover, since signal wiring 44 is disposed on the side surface 52 side and high-voltage wirings 45A, 45B are disposed on the upper surface 57 side, noises emitted from high-voltage wirings 45A, 45B are suppressed from reaching signal wiring 44.

Third Embodiment

Figure 8:
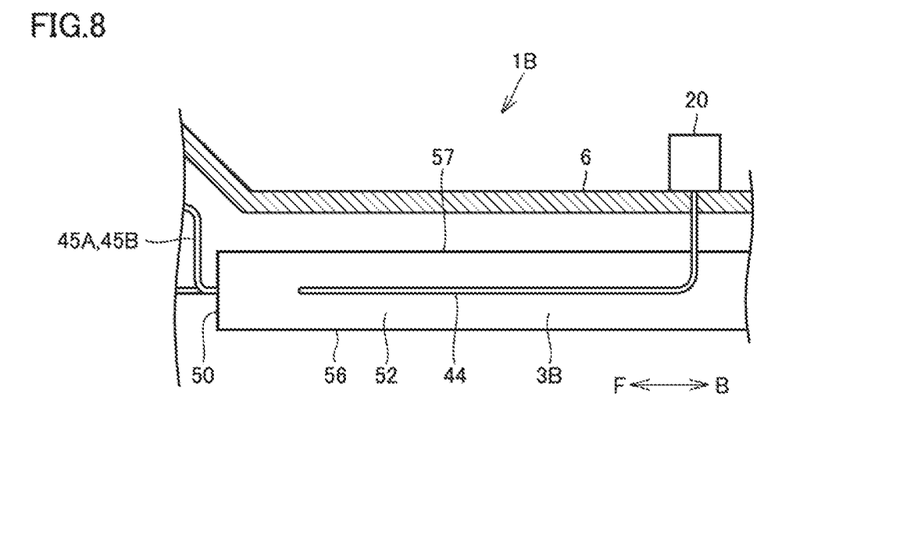
FIG. 8 is a side view schematically showing a vehicle 1B according to a third embodiment.
Figure 9:
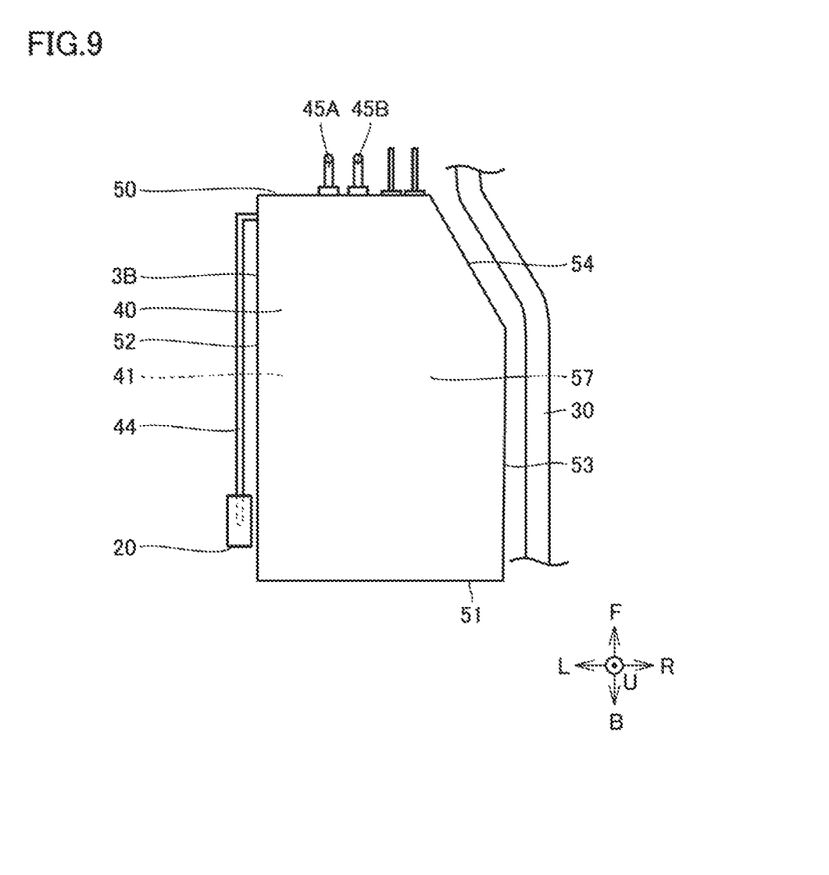
FIG. 9 is a plan view schematically showing vehicle 1B.

A vehicle 1B according to the third embodiment will be described with reference to FIG. 8 and the like. FIG. 8 is a side view schematically showing a vehicle 1B according to the third embodiment, and FIG. 9 is a plan view schematically showing vehicle 1B.

Vehicle 1B includes a power storage device 3B. In power storage device 3B, high-voltage wirings 45A, 45B are formed to be drawn out from front end surface 50 of power storage device 3B to the outside and then extend toward the upper side. It should be noted that signal wiring 44 and exhaust pipe 30 are disposed in the same manner as those in the first and second embodiments.

In vehicle 1B thus configured, since high-voltage wirings 45A, 45B are formed to be drawn out from front end surface 50 and then immediately extend toward the upper side, high-voltage wirings 45A, 45B are separated from signal wiring 44 in the upward-downward direction. Therefore, even when noises are emitted from high-voltage wirings 45A, 45B, the noises are suppressed from reaching signal wiring 44.

Figure 10:
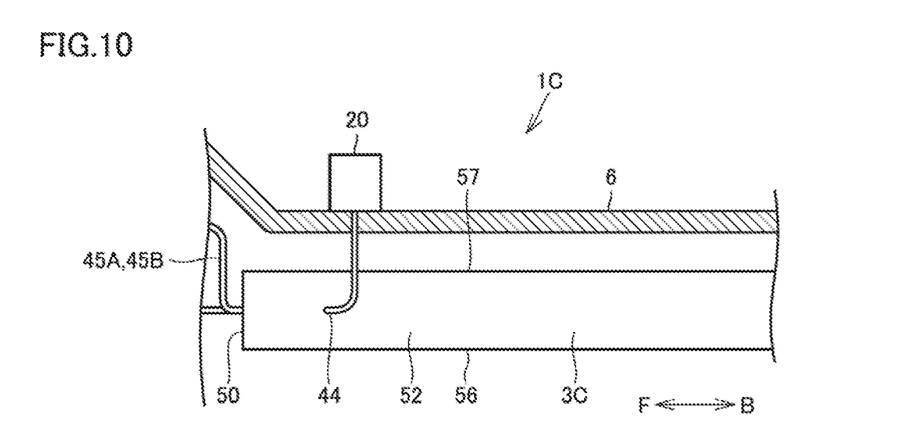
FIG. 10 is a side view showing a modification.

FIG. 10 is a side view showing a modification. In a vehicle 1C shown in FIG. 10, signal wiring 44 is formed to be drawn out from side surface 52 of power storage device 3C to the outside and then extend toward the upper side. By disposing signal wiring 44 in this manner, the length of signal wiring 44 located below floor panel 6 can be short. Accordingly, noises from high-voltage wirings 45A, 45B can be suppressed from entering signal wiring 44.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle comprising:
a power storage device;
an internal combustion engine;
an exhaust pipe connected to the internal combustion engine; and
an in-vehicle device provided outside the power storage device, wherein
the power storage device includes
an accommodation case including a front surface, a back surface, a first side surface, and a second side surface located opposite to the first side surface,
a power storage module accommodated in the accommodation case,
a high-voltage wiring connected to the power storage module and drawn out from the front surface or the back surface to outside of the accommodation case,
an electronic device accommodated in the accommodation case, and
a signal wiring connected to the electronic device and the in-vehicle device, the signal wiring being a signal wiring in which a signal to be received or transmitted by the electronic device or the in-vehicle device travels,
the exhaust pipe is disposed at a position adjacent to the first side surface, and
the signal wiring is drawn out from the second side surface to the outside of the accommodation case, wherein
the high-voltage wiring extends from the front surface of the accommodation case toward a front side or upper side of the vehicle, and
the signal wiring is provided to extend from the second side surface toward a back side or upper side of the vehicle.

2. A vehicle comprising:
a power storage device;
an internal combustion engine;
an exhaust pipe connected to the internal combustion engine; and
an in-vehicle device provided outside the power storage device, wherein
the power storage device includes
an accommodation case including a front surface, a back surface, a first side surface, and a second side surface located opposite to the first side surface,
a power storage module accommodated in the accommodation case,
a high-voltage wiring connected to the power storage module and drawn out from the front surface or the back surface to outside of the accommodation case,
an electronic device accommodated in the accommodation case, and
a signal wiring connected to the electronic device and the in-vehicle device, the signal wiring being a signal wiring in which a signal to be received or transmitted by the electronic device or the in-vehicle device travels,
the exhaust pipe is disposed at a position adjacent to the first side surface, and
the signal wiring is drawn out from the second side surface to the outside of the accommodation case, and further comprising a floor panel that partitions inside of the vehicle and outside of the vehicle, wherein
the in-vehicle device is provided in the inside of the vehicle, and
the floor panel is provided with a through hole via which the signal wiring enters the inside of the vehicle.

* * * * *